Figure 1:
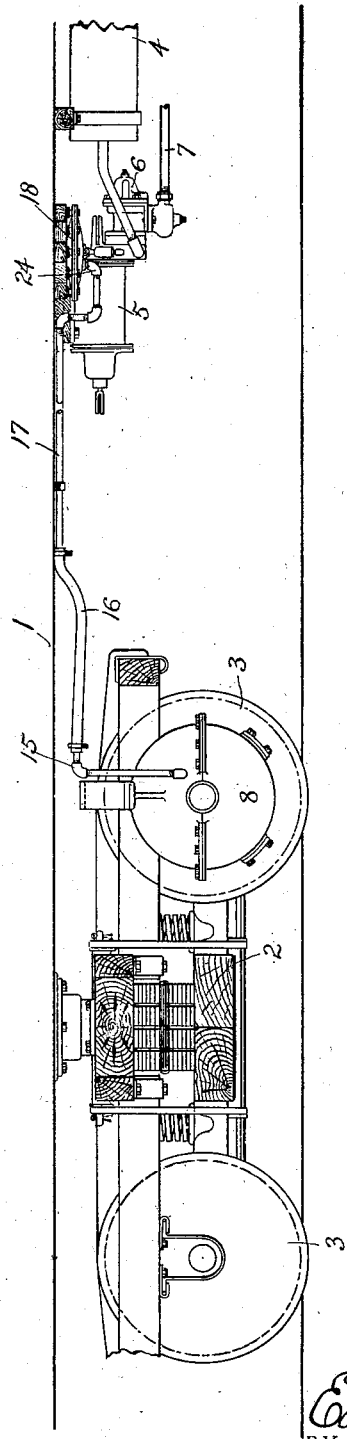

No. 725,995. PATENTED APR. 21, 1903.
E. G. SHORTT.
HIGH SPEED BRAKE MECHANISM.
APPLICATION FILED APR. 19, 1900. RENEWED OCT. 25, 1902.
NO MODEL. 6 SHEETS—SHEET 1.

WITNESSES:
H. J. Shortt
John Unsur

INVENTOR.
Edward G. Shortt
BY
Fred E. Tasker
ATTORNEY.

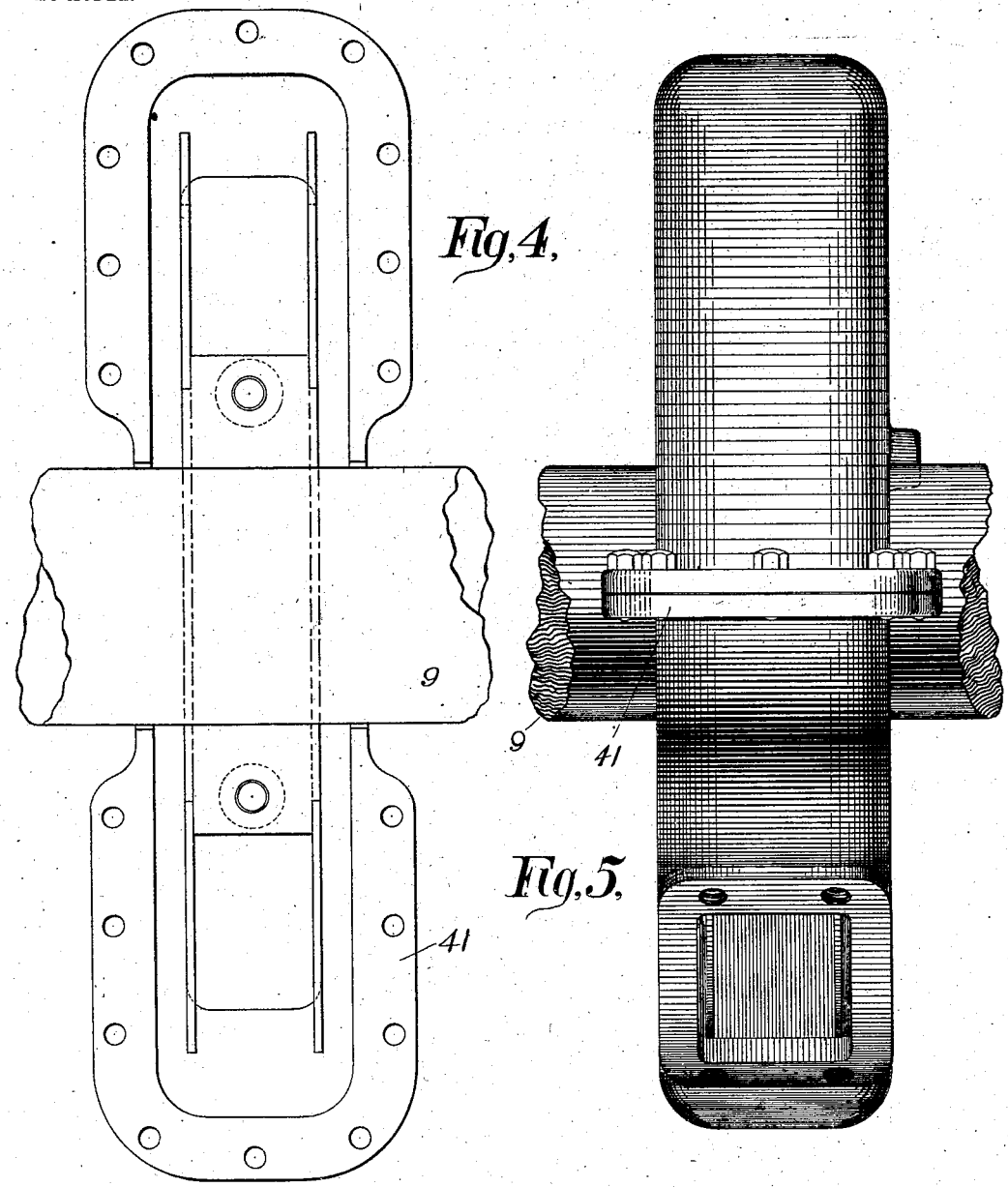

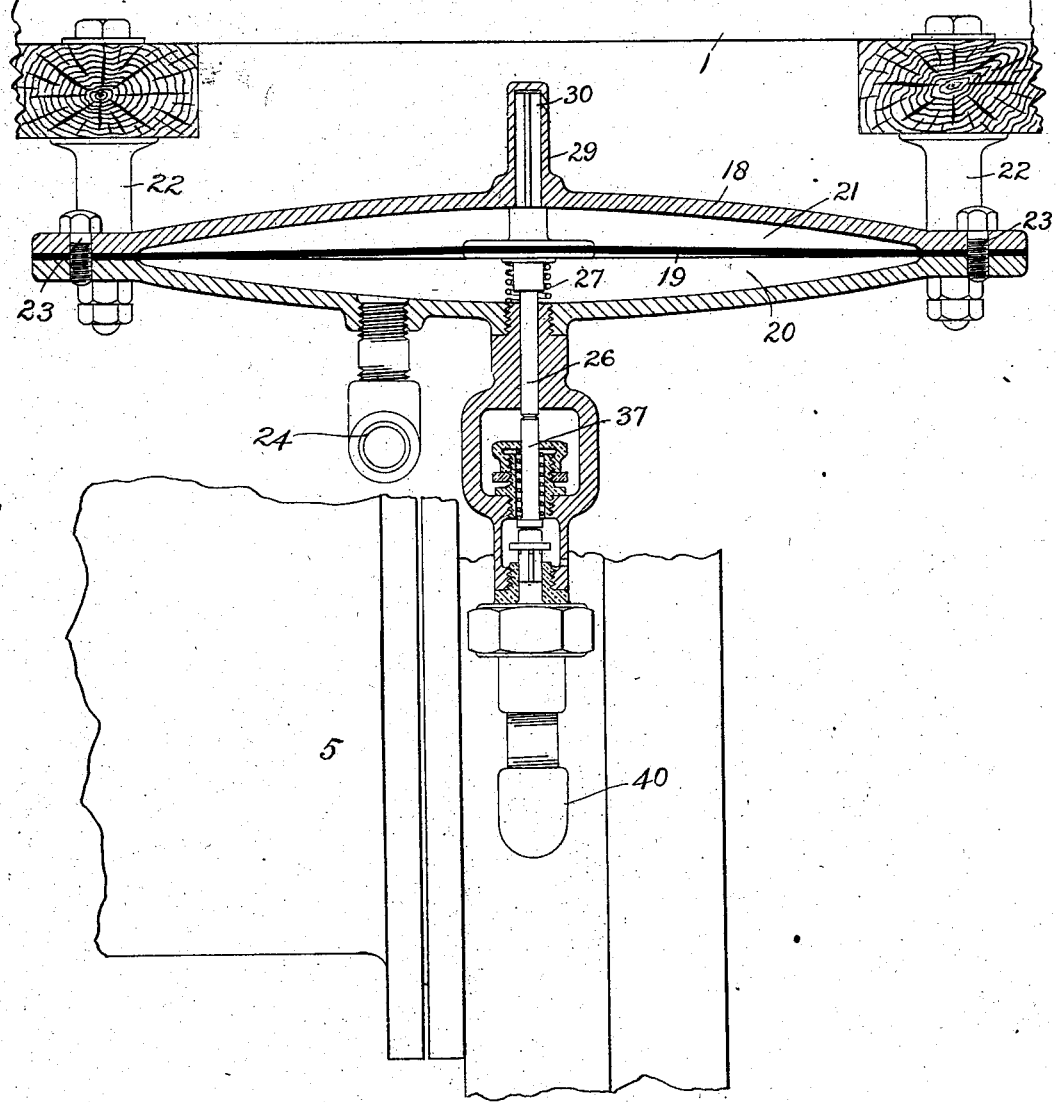

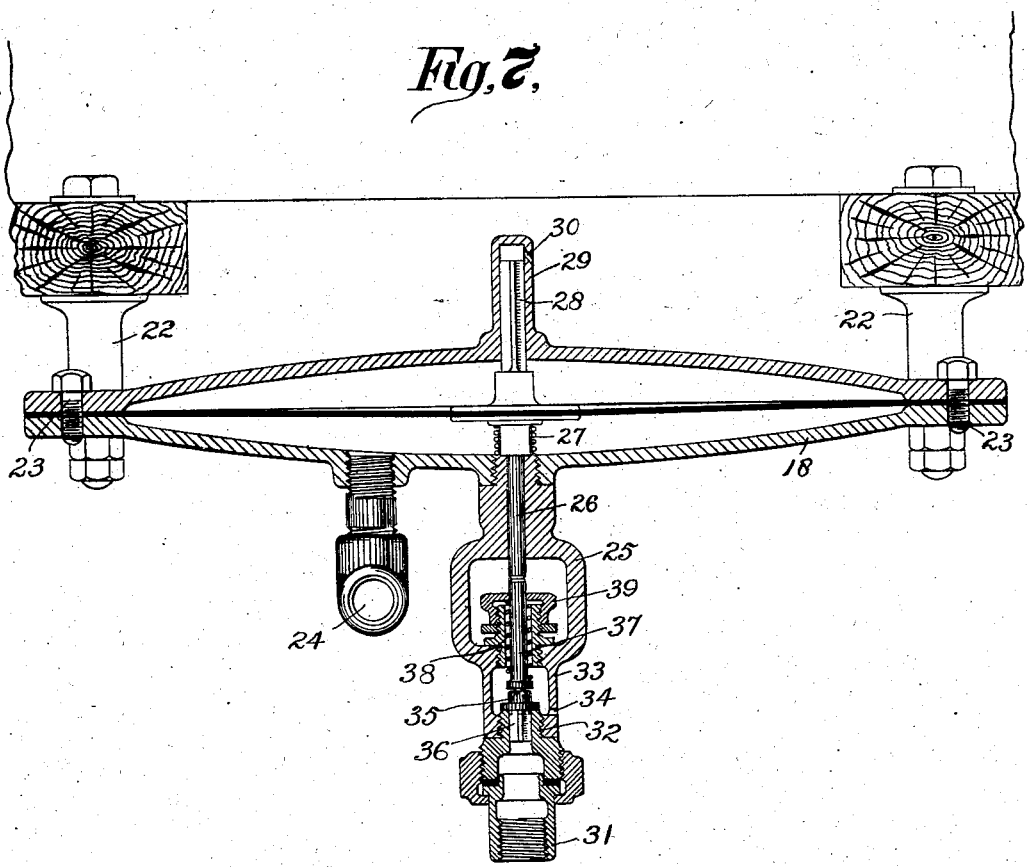

UNITED STATES PATENT OFFICE.

EDWARD G. SHORTT, OF CARTHAGE, NEW YORK, ASSIGNOR TO THE INTERNATIONAL AIR BRAKE COMPANY, A CORPORATION OF NEW JERSEY.

HIGH-SPEED BRAKE MECHANISM.

SPECIFICATION forming part of Letters Patent No. 725,995, dated April 21, 1903.

Application filed April 19, 1900. Renewed October 25, 1902. Serial No. 128,826. (No model.)

*To all whom it may concern:*

Be it known that I, EDWARD G. SHORTT, a citizen of the United States of America, and a resident of Carthage, in the county of Jefferson and State of New York, have invented certain new and useful Improvements in High-Speed Air-Brake Mechanism, of which the following is a specification.

My present improvements relate to a high-speed air-brake mechanism. The object thereof is to enable quicker stops to be made in the running of a fast express-train.

In carrying the invention into practical effect a high braking power is employed, and this is secured quickly and held as long as may be necessary.

A predominant characteristic of the invention consists in this, that a large braking power of the requisite strength is obtained without any unnecessary wastage of air, so that economy is subserved in the use of my device. The release of this high pressure and consequent diminution of braking power takes place coincidently with the decrease in the speed of the train, and this diminution of pressure is regulated automatically in such a manner and at such a time as to retard the running of the train without causing the wheels to slip on the rails and without any escape of air from the time of the initial acting the application of the brakes until its conclusion, except at the proper time, which is automatically determined, as stated.

The invention consists, essentially, in means for increasing or diminishing the weight or power for keeping a brake-cylinder release-valve closed, and the particular example of means for accomplishing this end comprises means for causing a vacuum, which operates a diaphragm device arranged to control the brake-cylinder excess-exhaust valve, said valve being set to normally and constantly withstand a pressure of sixty pounds or so in the brake-cylinder, but adapted to be loaded or weighted by the pressure of the atmosphere applied thereto through the service of a diaphragm of predetermined area, so as to be capable of withstanding braking pressure of as great strength as may be needed for use in fast service, which high pressure can be held intact as long as necessary and only released at the proper moment and automatically in order to stop or slow down the train in the shortest distance and in the least time; and the invention may be said to further consist, essentially, in the construction, arrangement, and combination of parts substantially as will be hereinafter described and claimed.

Figure 2:
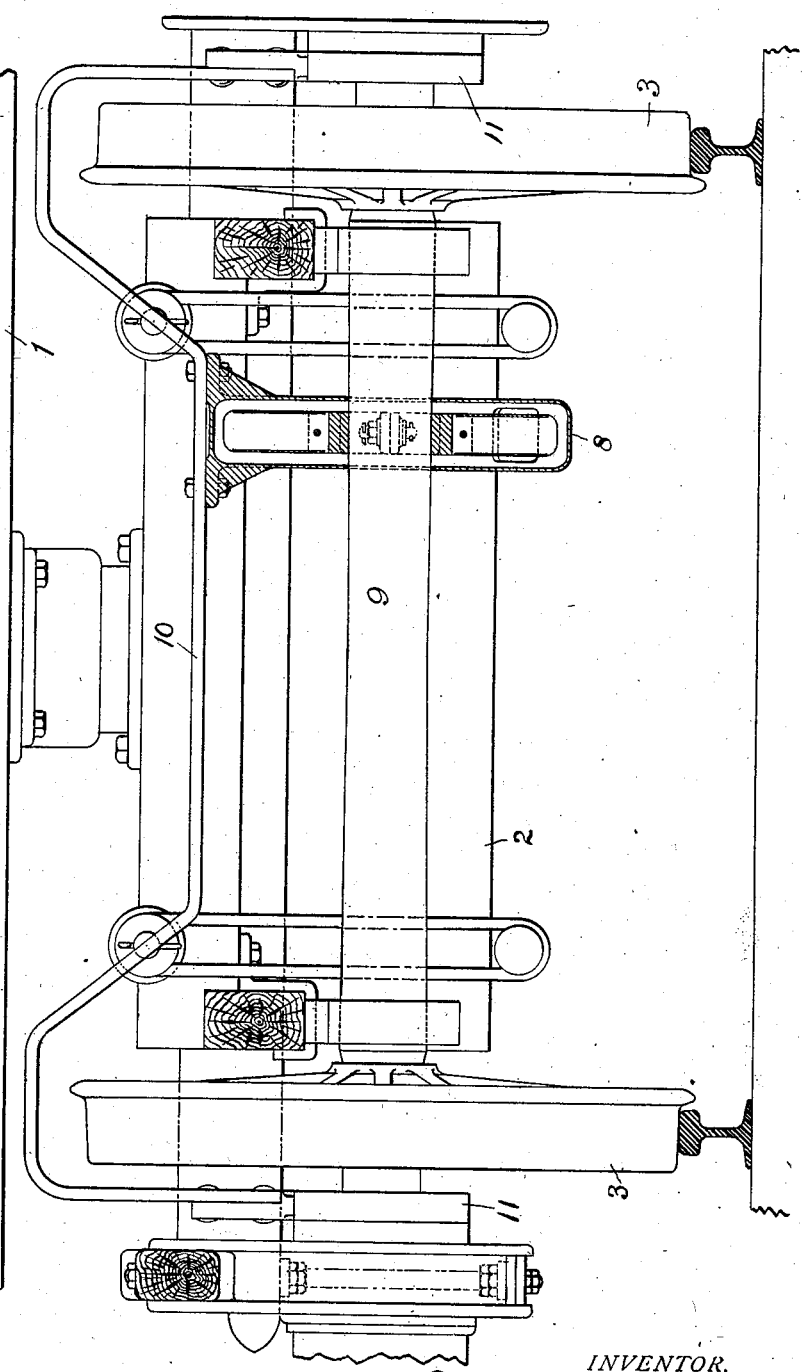
Figure 3:
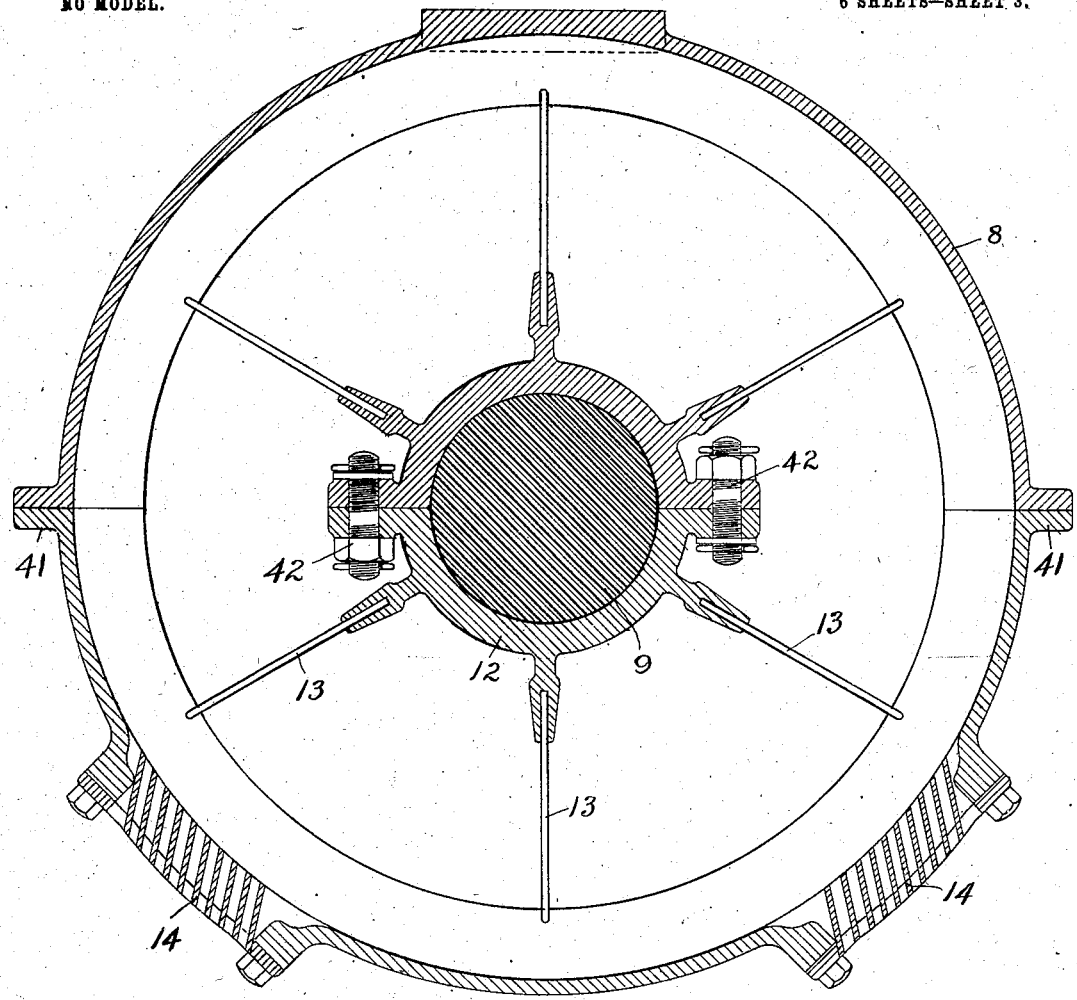

In the annexed drawings, illustrating my invention, Figure 1 is a side elevation of a car-truck and the essential parts of an air-brake mechanism, showing my high-speed improvement practically applied thereto in operative position. Fig. 2 is a front elevation of a car-truck, on an enlarged scale, and shows the manner of supporting the fan-casing. Fig. 3 is a vertical section of the fan-casing. Fig. 4 is an outline plan view of half of said casing, showing the car-axle and illustrating the flanges on said part of the casing that are adapted to be bolted to corresponding flanges on the other half of said casing. Fig. 5 is an edge elevation of the casing and shows the car-axle running through it. Fig. 6 is a sectional view of the diaphragm-chamber and brake-cylinder release-valve, the latter being open. Fig. 7 is a similar view with the release-valve closed.

Like numerals of reference denote like parts in all the figures of the drawings.

1 denotes the bottom of a railway passenger-coach; 2, one of the truck-frames; 3 3, the trucks or wheels; 5, the brake-cylinder; 6, the triple valve; 4, the auxiliary reservoir; 7, the train-pipe, and 8 the casing containing the exhaust-fan belonging to my present improvement.

Casing 8 is mounted in connection with the truck-frame, as shown in Figs. 1 and 2, by means of a transversely-arranged bent bar or frame 10, whose ends are secured to the dust-guards 11 11, that are supported on the axle 9 outside of the wheels 3. This kind of a support is necessary in order that said casing may be held stationary relatively to the position of the axle which passes centrally through it, for as the fan is carried by the axle and rotates therewith, and as the axle has no other motion except that of revolution on its axis, it is necessary to so support the casing that it will remain immovable relatively to the axle. Inasmuch as such a position for the casing could not be had by attaching the casing directly to the truck-frame, it being yielding by reason of the springs, nor by attaching it to any other part except the dust-guards, since they are carried on the axle, it becomes desirable to connect the support 10 to said guards.

Casing 8 consists, essentially, of two half-sections which are bolted together by bolts passing through the flanges 41. (See Figs. 4 and 5.) Within the casing (see Fig. 3) is a fan composed of radial arms, vanes, or blades 13, carried by a bisectional hub 12, whose parts are clamped together and around axle 9 by means of suitable clamping-bolts. At points in the periphery of casing 8 are air outlets or openings 14 14, which are grated to prevent the entrance into its interior of dirt, brush, and other refuse or waste substances which might be thrown in during the car's movement. The revolution of the fan in consequence of the rotation of the axle exhausts the air from the casing and creates a vacuum therein.

From the side of casing 8 there extends upwardly a pipe 15, and on the under side of the car-body 1 is supported a pipe 17, said pipes being connected by means of a flexible hose-coupling 16 to permit of the usual oscillation of the car-body without breaking the said pipe-line. Pipe 17 has an elbow 24, which couples to the diaphragm-chamber 18. Hence the fan not only exhausts air from its own casing, but also through the line of piping draws the air from the interior of the diaphragm-chamber 18 on one side of the diaphragm. The chamber 18 is supported by brackets 22 22 on the under side of car-body 1.

The diaphragm-chamber 18 comprises two convex plates located with their edges in contact and bolted together by bolts 23. A diaphragm 19, of rubber, metal, or other suitable material, is located within chamber 18 and its edges clamped between the meeting edges of the convex plates, so as to divide chamber 18 into two compartments—an upper one, 21, and a lower one, 20. The lower compartment 20 is the one entered by the elbow 24 and the one connected to the exhaust-fan. At the center of diaphragm 19 and on top of same is a winged rod 28, that enters and is adapted to vertically oscillate in a hollow central projection 29 on the chamber 18, said projection or guide 29 having an air-inlet perforation 30 to admit air into compartment 21. On the under side of diaphragm 19 at the center is a downwardly-projecting rod 26, the lower end of which enters a chamber 25, formed in a casting that is securely attached to the chamber 18 in a vertical position beneath the latter, said casting containing also a valve-casing 33, to which is connected a pipe or passage 31, leading to the coupling 40, which makes connection with the interior of the brake-cylinder. A spring 27 is tensioned beneath the center of the diaphragm 19 and acts to lift said diaphragm to its normal position (shown in Fig. 6) after any agency that may have depressed it has been removed.

35 designates the brake-cylinder release or exhaust valve, which is located in the casing 33. Said casing has an outlet 34 to the atmosphere. 32 denotes the seat of said valve. In a central passage thereof the lower winged projection 36 on the valve has play, as in a guide. The valve 35 has an upwardly-extending stem 37, the end of which is in the chamber 25 and is in alinement with diaphragm-rod 26, and the two are designed to come into contact with each other at times in the operation of the device. A spring 38, coiled about the rod 37 and tensioned between valve 35 and a screw-cap 39 in chamber 25, serves to keep the valve 35 normally closed with a pressure of about sixty pounds.

I will now discuss the operation. The running of the train causes the formation of a vacuum in the fan-casing 8, the pipes 15, 16, and 17, and the compartment 20 beneath the diaphragm 19, which vacuum is more or less perfect in proportion to the speed of the train, it being obvious that the faster the train runs the more completely will the air be exhausted from the compartment 20. Now I have already stated that the brake-cylinder valve 35 is provided with a spring 38, set to withstand a pressure of sixty pounds, said valve therefore retaining pressure in the brake-cylinder and never opening unless such inner pressure exceeds sixty pounds; but when a vacuum has been created below the diaphragm 19 and said diaphragm has been deflected downwardly at the center out of its horizontal plane (see Fig. 7) the end of diaphragm-rod 26 is brought in contact with the end of the valve-rod 37, and consequently an additional closing pressure is placed upon the brake-cylinder valve, which supplements the action of spring 38, such additional pressure being in proportion to the area of the diaphragm and the completeness of the vacuum. The operation is as if a weight or weights were added to the valve 35 to keep it closed. The proper area of the diaphragm can be determined by experiment and will be proportionate to the speed of the train. This retaining pressure on the valve will manifestly be regulated automatically and will be sufficient to enable the employment of a very high degree of braking pressure when the train is running at great speed without any waste of air in the brake application, for the braking pressure may be held applied as long as may be necessary. When the speed of the train succumbs to the retarding effect of the brake, a point will be reached when the gradual destruction of the vacuum during the slowing-down process will lift enough of the weight off the valve to equalize the outer closing pressure on the valve with the inner braking pressure on the other side thereof, and the former pressure will drop below the latter, and when this occurs the valve will gradually open and pressure will escape to atmosphere until the entire braking pressure in excess of sixty pounds has been allowed to escape, the release of braking power taking place, therefore, in correspondence with the decrease in the running speed of the train.

Although my present improved high-speed brake device is adaptable for use with various kinds of brake systems, and I do not intend to be restricted to any particular one, yet I desire to state that it may be used to great advantage with the air-brake valve mechanism shown and described in my copending application, filed April 16, 1900, Serial No. 13,107, and that when employed in conjunction with said valve in releasing the excess pressure over sixty pounds only brake-cylinder air will be disposed of to the atmosphere and auxiliary-reservoir air will not be touched.

Numerous changes in the combination and arrangement and in the construction of the various parts may be made without departing from my invention.

Having thus described my invention, what I claim as new, and desire to secure by Letters Patent, is—

1. In a fluid-pressure air-brake mechanism, a brake-cylinder release-valve set to normally retain a certain pressure in the cylinder, in combination with a vacuum-producing mechanism operated by the running train for regulating the retaining power of said valve.

2. In a fluid-pressure brake mechanism, a brake-cylinder release-valve set to normally retain a certain pressure in the cylinder, in combination with a diaphragm and means for causing a vacuum on one side thereof for automatically increasing the retaining power of said valve.

3. In a fluid-pressure brake mechanism, a brake-cylinder release-valve, in combination with means for automatically regulating the retaining power of said valve, said means consisting of a diaphragm exposed on one side to the pressure of atmospheric air and means for causing a vacuum on the other side of the diaphragm.

4. In a fluid-pressure brake mechanism, a brake-cylinder release-valve, in combination with means for automatically regulating the retaining power of said valve, said means consisting of a device on the car-axle for creating a vacuum and said means being controlled by the speed of the train so that the retaining pressure of the valve will vary as the speed varies.

5. In a fluid-pressure brake mechanism, in combination with the brake-cylinder, a release-valve therefor, and means, consisting essentially of vacuum-creating mechanism composed of a rotary fan on the car-axle which is automatically operated by the running train, for regulating the retaining power of said valve.

6. In a fluid-pressure brake mechanism, in combination with the brake-cylinder, a release-valve for the excess pressure over a fixed pressure, means for automatically regulating the retaining power of said valve, said means consisting essentially of a vacuum-producing mechanism operated by the running train, and means whereby the vacuum controls the closing power of the valve, said closing power varying as the vacuum varies.

7. In a fluid-pressure brake mechanism, in combination with the brake-cylinder, a release-valve therefor having a spring set to retain a certain pressure in the cylinder, an exhaust-fan actuated from the car-axle, and a diaphragm movable by the vacuum thus created so as to place additional pressure on the release-valve.

8. In a fluid-pressure brake mechanism, a brake-cylinder release-valve, in combination with means for automatically regulating the retaining power of said valves, said means being controlled by the speed of the running train and consisting essentially of a diaphragm exposed on one side to the pressure of atmospheric air and means for causing a vacuum on the other side of said diaphragm, together with a connection between the diaphragm and the release-valve.

9. In a fluid-pressure brake mechanism, a brake-cylinder release-valve, in combination with means for automatically regulating the retaining power of said valve, said means comprising a rotary fan on the car-axle, a fan-casing carried by the truck-frame, a diaphragm-chamber containing a diaphragm, and a connection between the diaphragm and the release-valve.

10. In a fluid-pressure brake mechanism, a brake-cylinder release-valve, in combination with a rotary fan on the car-axle, a fan-casing carried on the truck-frame, a diaphragm-chamber containing a diaphragm that divides the chamber into two parts, the upper chamber receiving the atmospheric air while the lower chamber has a vacuum controlled by the action of the fan, and a connection between the diaphragm and the release-valve.

11. In a fluid-pressure brake mechanism, the combination of a brake-cylinder, a release-valve, pressure-generating means consisting essentially of a rotary fan on the car-axle, a diaphragm-chamber, the diaphragm therein dividing the chamber into two parts, the upper chamber containing air at atmospheric pressure and the lower having therein a vacuum caused by the action of the fan, and a valve-stem for the release-valve to which stem the diaphragm is attached.

Signed at Carthage, New York, this 14th day of April, 1900.

EDWARD G. SHORTT.

Witnesses:
W. W. SWEET,
E. J. WESTCOTT.